United States Patent
Smith et al.

(10) Patent No.: US 7,690,499 B2
(45) Date of Patent: Apr. 6, 2010

(54) TUBE CONVEYOR WITH SEALING BELT EDGES

(75) Inventors: David Richard Smith, Fort Jennings, OH (US); Michael J. Hilvers, Fort Jennings, OH (US); Brian James Petersen, Ottawa, OH (US)

(73) Assignee: Unverferth Manufacturing Company Inc., Kalida, OH (US)

( * ) Notice: Subject to any disclaimer, the term of this patent is extended or adjusted under 35 U.S.C. 154(b) by 64 days.

(21) Appl. No.: 12/031,875

(22) Filed: Feb. 15, 2008

(65) Prior Publication Data

US 2008/0230354 A1    Sep. 25, 2008

Related U.S. Application Data

(60) Provisional application No. 60/901,326, filed on Feb. 15, 2007.

(51) Int. Cl.
*B65G 21/20* (2006.01)
(52) U.S. Cl. .................. 198/836.1; 198/690.2; 198/801
(58) Field of Classification Search ............. 198/690.2, 198/801, 819, 836.1–836.4
See application file for complete search history.

(56) References Cited

U.S. PATENT DOCUMENTS

| | | | | |
|---|---|---|---|---|
| 3,429,422 | A | * | 2/1969 | Yoshimura ............... 198/699.1 |
| 4,809,844 | A | * | 3/1989 | Hashimoto et al. .......... 198/819 |
| 5,320,214 | A | * | 6/1994 | Kordis ........................ 198/837 |
| 5,660,283 | A | * | 8/1997 | Groh et al. ................ 209/223.1 |
| 6,209,880 | B1 | * | 4/2001 | Turnwald et al. ............ 277/402 |
| 6,405,855 | B1 | * | 6/2002 | Peltier et al. ................ 198/819 |
| 6,557,697 | B1 | * | 5/2003 | Bowman .................. 198/836.3 |
| 7,000,758 | B2 | * | 2/2006 | Bjorklund ................... 198/716 |
| 7,281,625 | B2 | * | 10/2007 | Wilmo et al. ............... 198/841 |
| 2002/0063043 | A1 | * | 5/2002 | Herren .................... 198/836.3 |
| 2009/0026047 | A1 | * | 1/2009 | Bowman .................. 198/836.1 |

* cited by examiner

*Primary Examiner*—Mark A Deuble
(74) *Attorney, Agent, or Firm*—Rothwell, Figg, Ernst & Manbeck, P.C.

(57) ABSTRACT

A tubular conveyor for conveying grain or seed includes an intake end having a first roller and a discharge end having a second roller. A tubular portion is disposed between the intake end and the discharge end. A continuous flexible conveyor belt is coupled with the first and second rollers. Seal means are provided for sealing edges of the conveyor belt at a point approximately where the conveyor belt meets at least one of the first and second rollers.

9 Claims, 11 Drawing Sheets

TUBE CONVEYOR WITH SEALING BELT EDGES

CROSS-REFERENCE TO RELATED APPLICATION

The present application claims priority to Provisional Patent Application Ser. No. 60/901,326 filed on Feb. 15, 2007, the entire disclosure of which is incorporated herein by reference.

BACKGROUND OF THE INVENTION

1. Field of the Invention

The present invention relates generally to a conveyor system for a grain or seed carrier. More particularly, the present invention relates to a belt driven tubular conveyor system having sealed edges at the rollers.

2. Description of the Related Art

Conveyor systems for moving grain, seed, etc. are well known. Auger systems are used to rapidly move grain such as feed or the like, while belt driven conveyors are often used for moving more expensive payload, such as seed. Tube conveyors have wide use in many applications, including in agriculture, where they are used to convey seed or grain from holding containers to seeding equipment or other containers.

Belt driven tube conveyors are known. In a typical configuration, a conveyor belt is wrapped around two rollers, one at a first end of the tube and another at the second end of the tube. At the rollers, the belt will start out flat but will cup into a tubular shape inside of a tubular portion of the conveyor and then flatten again at the other roller. When used with grain or seed, however, this configuration suffers from the problem that when the belt flattens out on the discharge end of the conveyor, there is great potential for grain or seed to fall off the edge of the belt, especially on steep inclines. The grain or seed that falls over the edge can collect between the upper and lower portions of the belt or get "sandwiched" between the end pulley, the belt and the conveyor housing resulting in severe damage to the grain and seed, and potential damage to the belt. This is especially undesirable with expensive cargo such as seed.

Thus, there is a need for new and improved conveyor systems.

SUMMARY OF THE INVENTION

According to an embodiment of the present invention, a belt driven conveyor is provided having an intake end having a first roller or pulley, a discharge end having a second roller or pulley, a tube section connected the intake end and the discharge end, and a conveyor belt installed about the first and second rollers or pulleys. A motor or other drive means can be provided for rotating one or both of the rollers or pulleys or otherwise moving the belt to carry cargo from the intake end to the discharge end. Seal means are provided at the discharge end for preventing cargo from moving off the side of the belt.

According to an embodiment of the present invention, the drive means includes a hydraulic motor. The hydraulic motor may be coupled with the first or second roller or pulley.

According to an embodiment of the present invention, seal means includes a pair of channeling members coupled with sides of the discharge end of the conveyor.

According to an embodiment of the present invention, teeth members or cleats are provided on the belt at selected positions for improving movement of grain.

According to an embodiment of the present invention, seal means include a pair of discs coupled with the rollers or pulleys and extending beyond the belt for sealing the point at which the belt travels around the roller or pulley.

According to another embodiment of the present invention, brush seals may be employed at the intake end of the conveyor to prevent cargo from moving off the end of the belt.

Further applications and advantages of various aspects and embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

In embodiments of the present invention, the novel conveyor pivot system can be implemented with seed carrier or seeding machines. The following section describes non-limiting examples of illustrative seeding equipment according to embodiments of the present invention. It should be appreciated that the following examples are provided for illustration and the present invention is not intended to be limited to the embodiments described herein.

Figure 1:
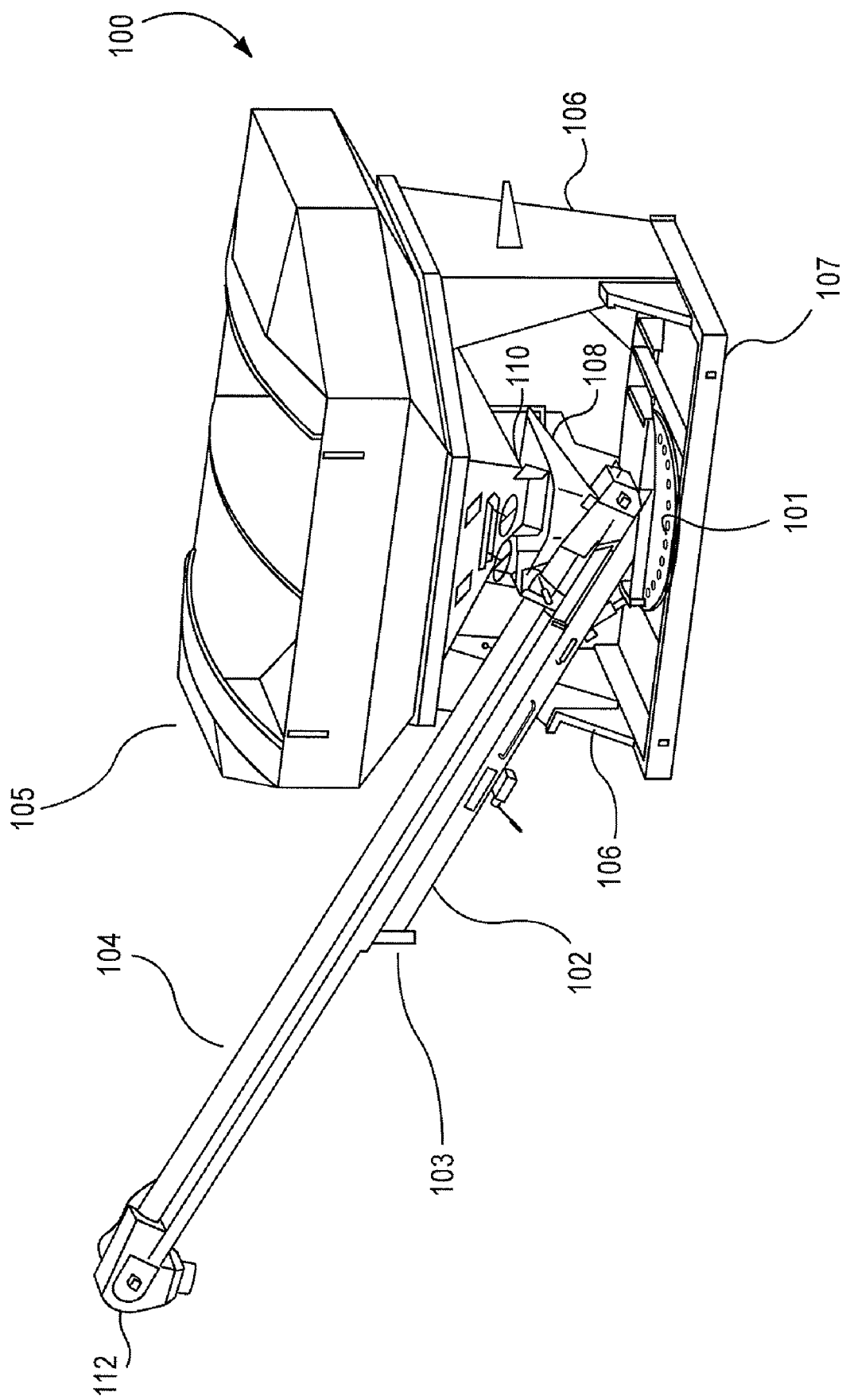
FIG. 1 illustrates a seed carrier according to an embodiment of the present invention.

FIG. 1 is a diagram depicting a seed carrier having a tube conveyor according to an embodiment of the present invention. The seed carrier 100 includes a main hopper 105 coupled to a frame 107 by legs 106. A conveyor 104 is supported by a support arm 102 coupled with a pivoting mechanism 101 fixed to the frame 107. The conveyor 104 is pivotably coupled with the support arm by a coupling 103 at a point that is preferably near or at the center of gravity of the conveyor 104. The conveyor 104 is also coupled to the support arm 102 by a latch (not shown) at the bottom of the conveyor. The latch allows the conveyor 104 to be uncoupled from the support arm 102 at the bottom so that the conveyor is free to rotate about the coupling 103. By positioning the coupling 103 at or near the center of gravity of the conveyor 104, the conveyor 104 balances on the pivoting coupling 103 such that little effort is required to rotate the conveyor 104.

The conveyor 104 includes a conveyor hopper 108 at its base, which is shown in the unloading position below the gravity discharge 110 of the main hopper 105. At the other end of the conveyor 104 is the discharge 112. Seed can be gravity feed from the main hopper 105 into the conveyor hopper 108, which can then be moved to the discharge 112 of the conveyor 104 by an internal elevator (not shown). In one embodiment, the elevator is a motor-driven belt type elevator coupled onto rollers at both ends of the conveyor.

Figure 2:
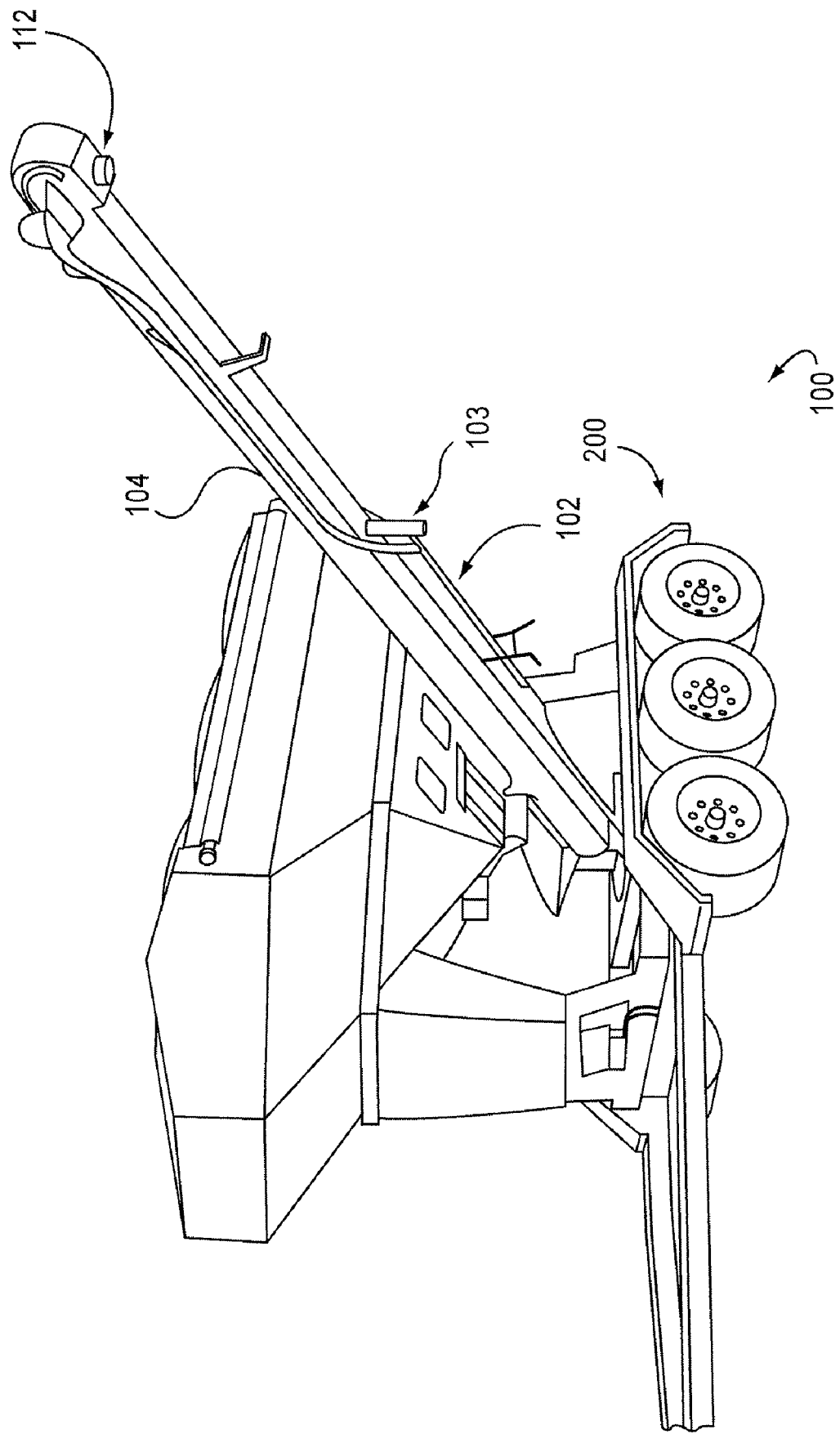
FIG. 2 is a view of a seed carrier in an unloading position according to an embodiment of the present invention.

The seed carrier 100 may be transported by conventional means such as on a trailer. FIG. 2 illustrates the seed carrier 100 on a three axle trailer 200 according to an embodiment of the present invention. As shown, the conveyor 104 is in the unloading position.

Figure 3:
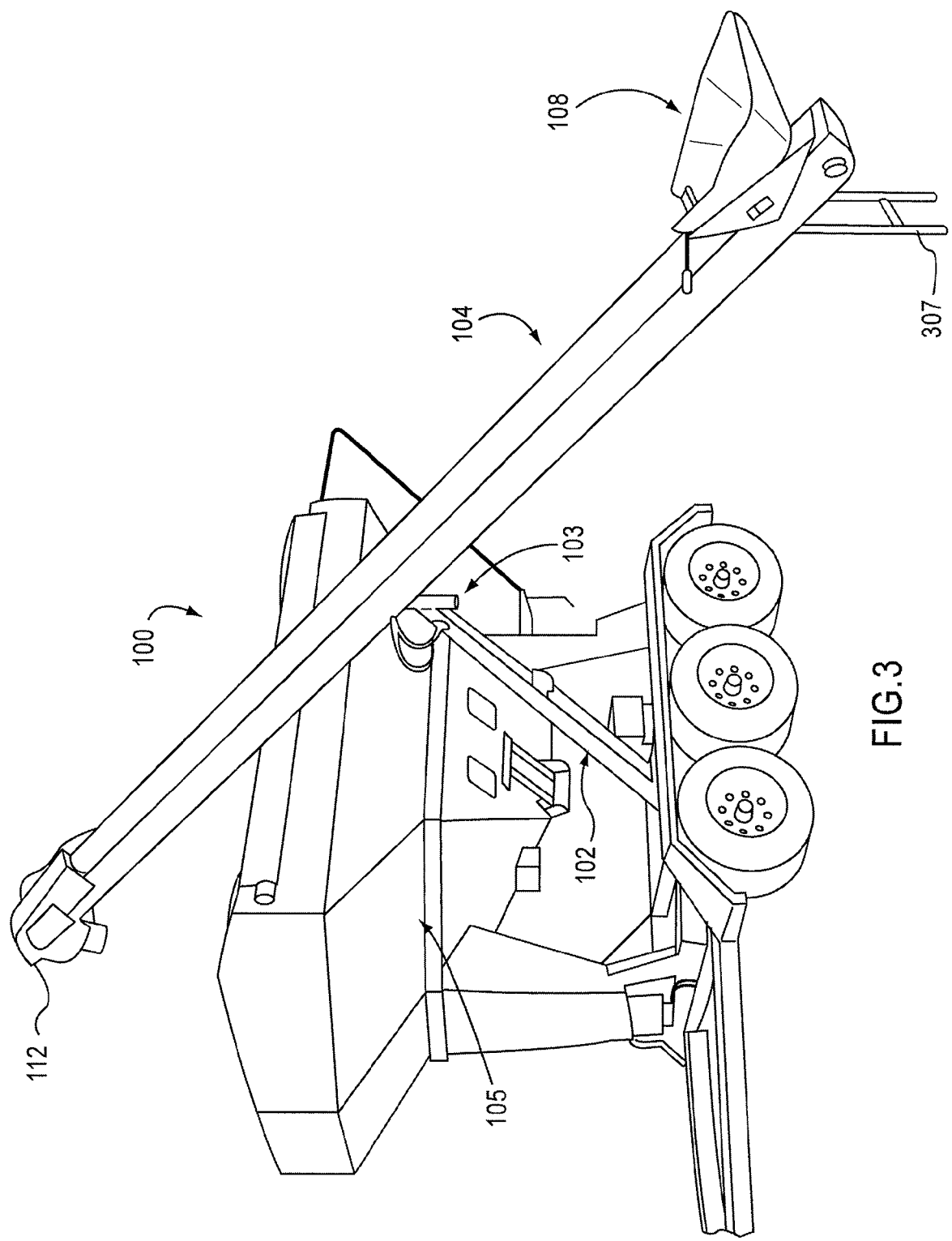
FIG. 3 is a view of a seed carrier in a loading position according to an embodiment of the present invention.

FIG. 3 illustrates the seed carrier 100 in the loading position. As shown, the conveyor 104 is uncoupled from the support arm 102 at its base and rotated 180 degrees about pivot coupling 103 so that the conveyor hopper 108 is positioned at a convenient location away from the carrier while the discharge 112 of the conveyor 104 is located over the main hopper 105. A stand 307 is provided for holding the conveyor hopper 108 in place. The stand 307 may be integrated with the conveyor 104.

Accordingly, in the loading position, grain, seed or like can be fed into the conveyor hopper 108 to be moved to the discharge 112 for filling the main hopper 105.

Figure 4:
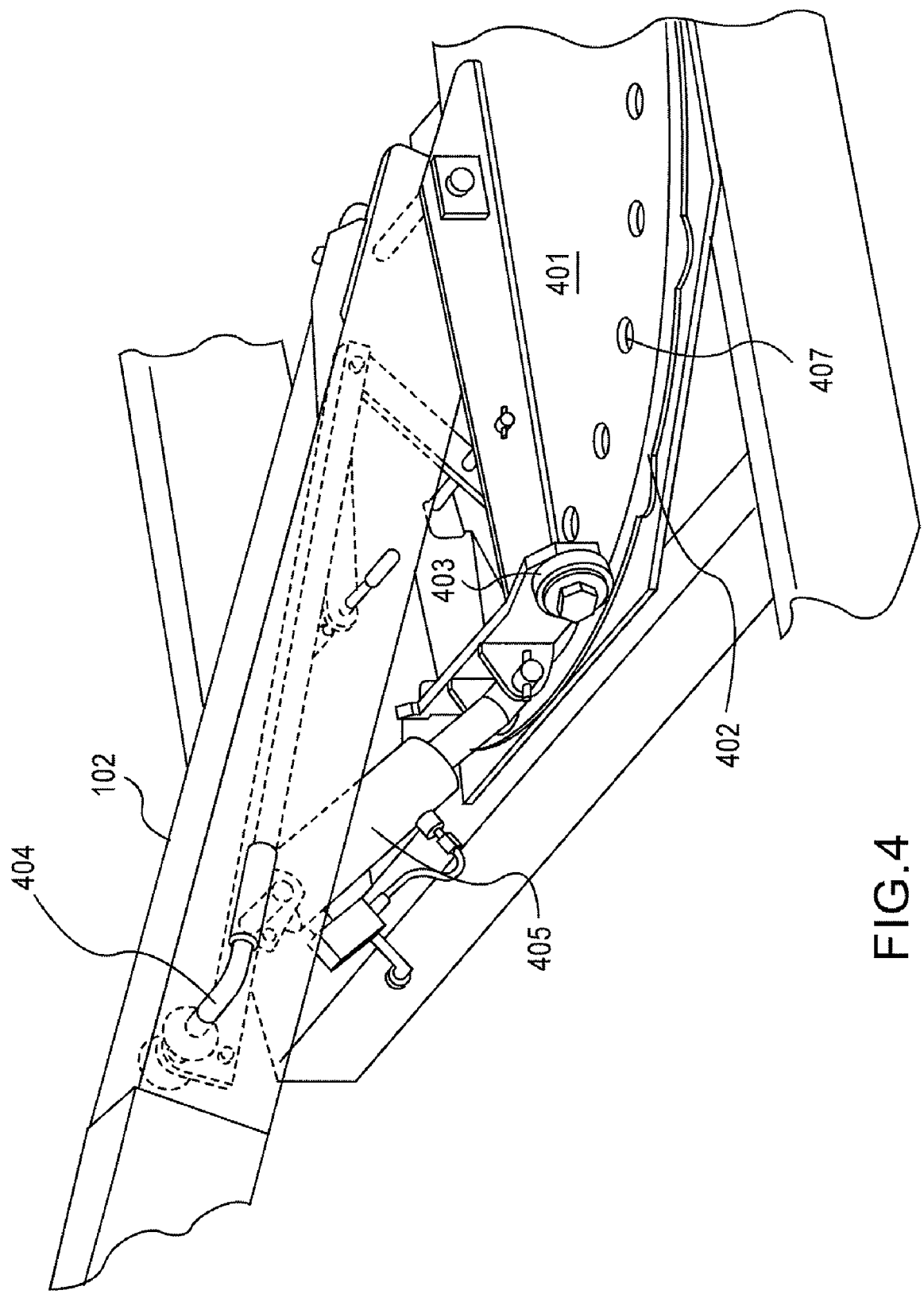
FIG. 4 is a view of a base system for the seed carrier according to an embodiment of the present invention.

FIG. 4 is a view of the pivoting base of the support arm 102. As shown, the support arm 102 can be pivotably coupled to a base 401 at a center point so that the support arm 102 is rotatable about a vertical axis. Wheels 403 provide support and can run along a track 402 to facilitate the support arm's 102 motion about the perimeter of the base 401. The support arm 102 can be locked into a selected position of the base 401 by engaging a pin (not shown) with one of a plurality of the holes 407 distributed around the base 401. The pin is disengaged with a hole by actuating a lever mechanism 404, which lifts the pin out of a hole. The lever mechanism 404 may be spring actuated to bias the pin toward the holes, so that simply releasing the lever will allow the pin to engage with one of the holes 407. Also shown, a hydraulic piston 405 is coupled with the support arm 102 for adjusting the height of the support arm 102.

Figure 5:
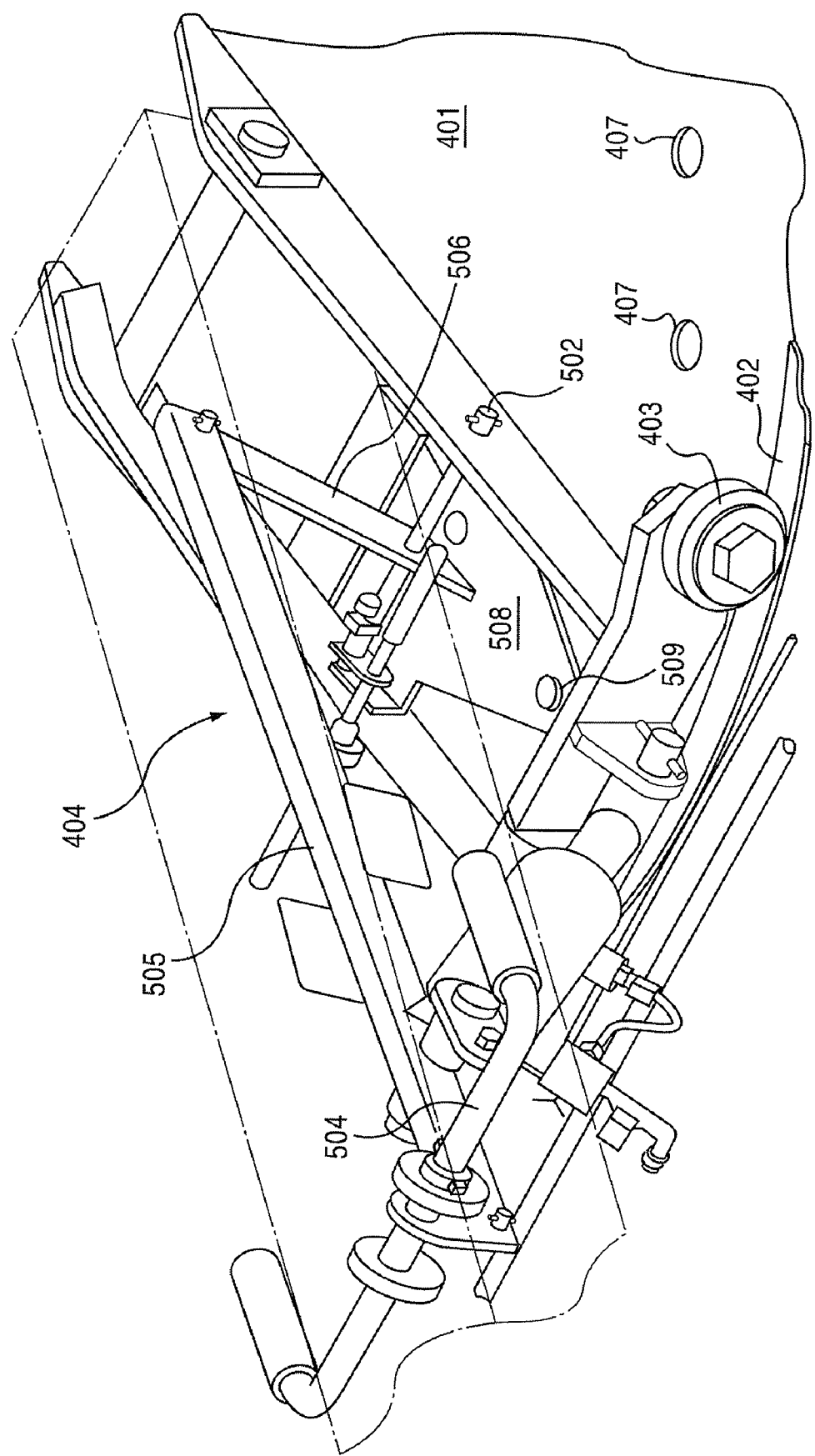
FIG. 5 is a view of a lever mechanism for the base system according to an embodiment of the present invention.

FIG. 5 is an alternative view of the support arm base. As shown, lever mechanism 404 includes a handle 504 coupled with a cross-bars 505 and 506. Cross-bar 506 is coupled to cross-bar 505 on one end and to a plate 508 having a pin 509 on the other end, and with a pivoting coupling 502 at a point near the plate. Rotating the handle 504 applies a downward force to crossbar 506 causing it to rotate about the coupling 502 to raise the plate 508 to disengage the pin 509. While disengaged, the base 401 is free to rotate about its vertical axis. Springs may be provided for biasing the pin 509 toward the holes 407 for engaging therewith, or the pin 509 can be engaged by gravity.

Figure 6:
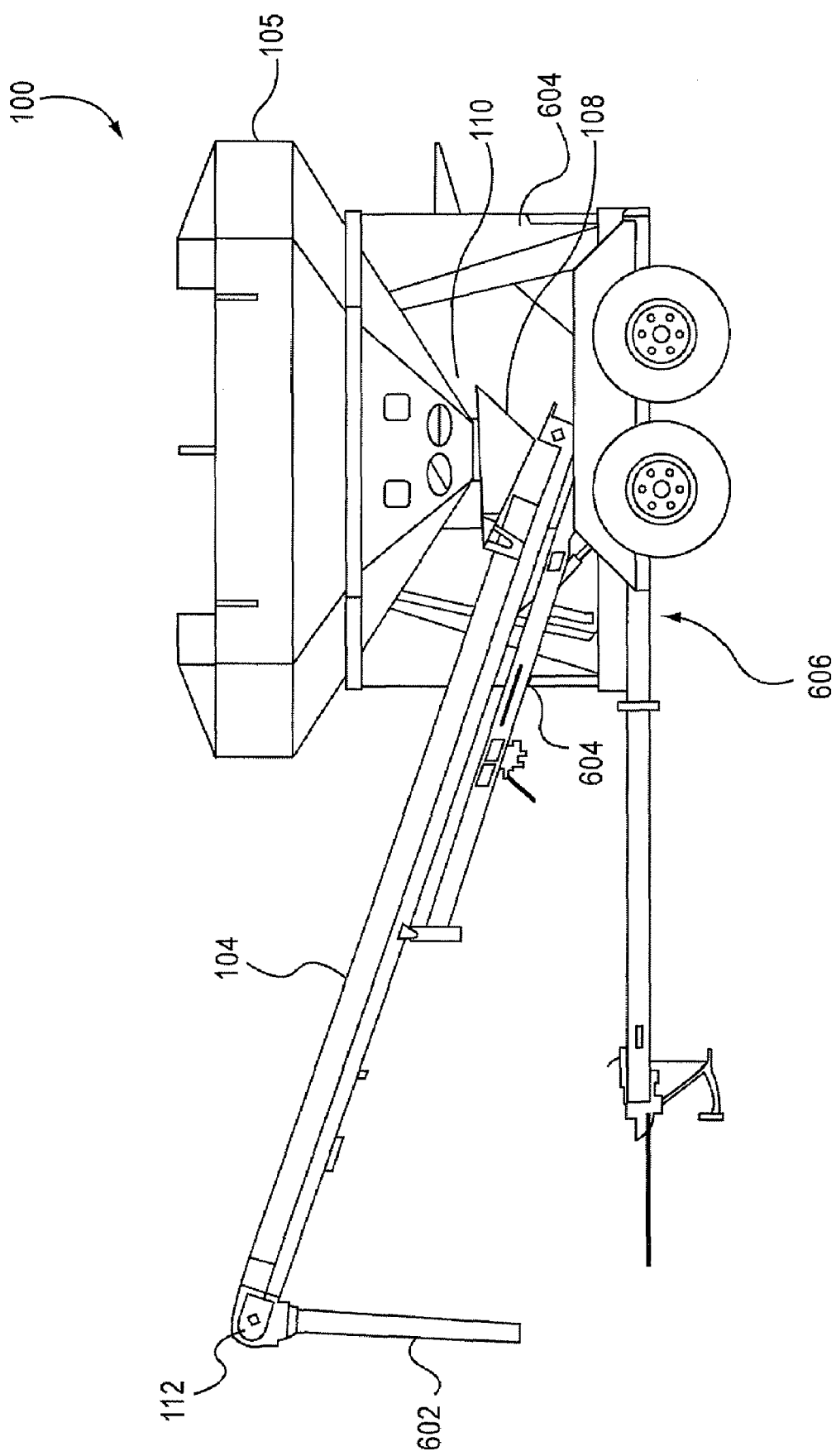
FIG. 6 is a view of a seed carrier in a transport position according to an embodiment of the present invention.

FIG. 6 is a side view of a seed carrier 100 according to an embodiment of the present invention. As shown in FIG. 6, the conveyor 104 includes an elongated discharge spout 602 and is positioned in a transport position. Support members 604 may be mounted on or integral with the legs 106 for holding the conveyor 104 in a forward transport position as shown, or a rearward transport position. As shown, the carrier 100 is fixed to a dual axle trailer 606.

Figure 7:
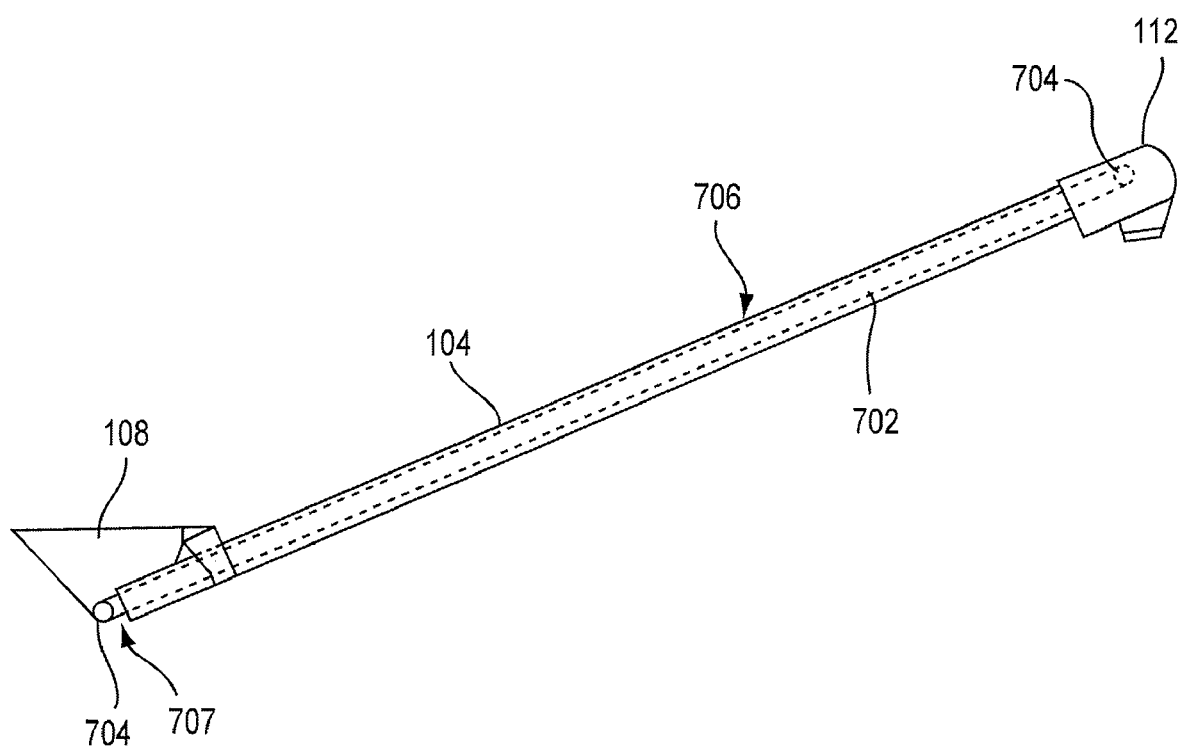
FIG. 7 is a view of a belt conveyor for the seed carrier according to an embodiment of the present invention.

FIG. 7 illustrates a basic belt driven conveyor according to an embodiment of the present invention. The conveyor 104 comprises a continuous flexible belt 702 that winds about a pair of rollers 704. The rollers are positioned outside tube section 706. A first roller is positioned in the discharge 112, and a second roller being positioned below the conveyor hopper 108. A motor (not shown) or other means for turning the rollers may be provided at either end of the conveyor. A void 707 exists below the rollers 704 to allow the belt 702 to travel on its return path.

Figure 8:
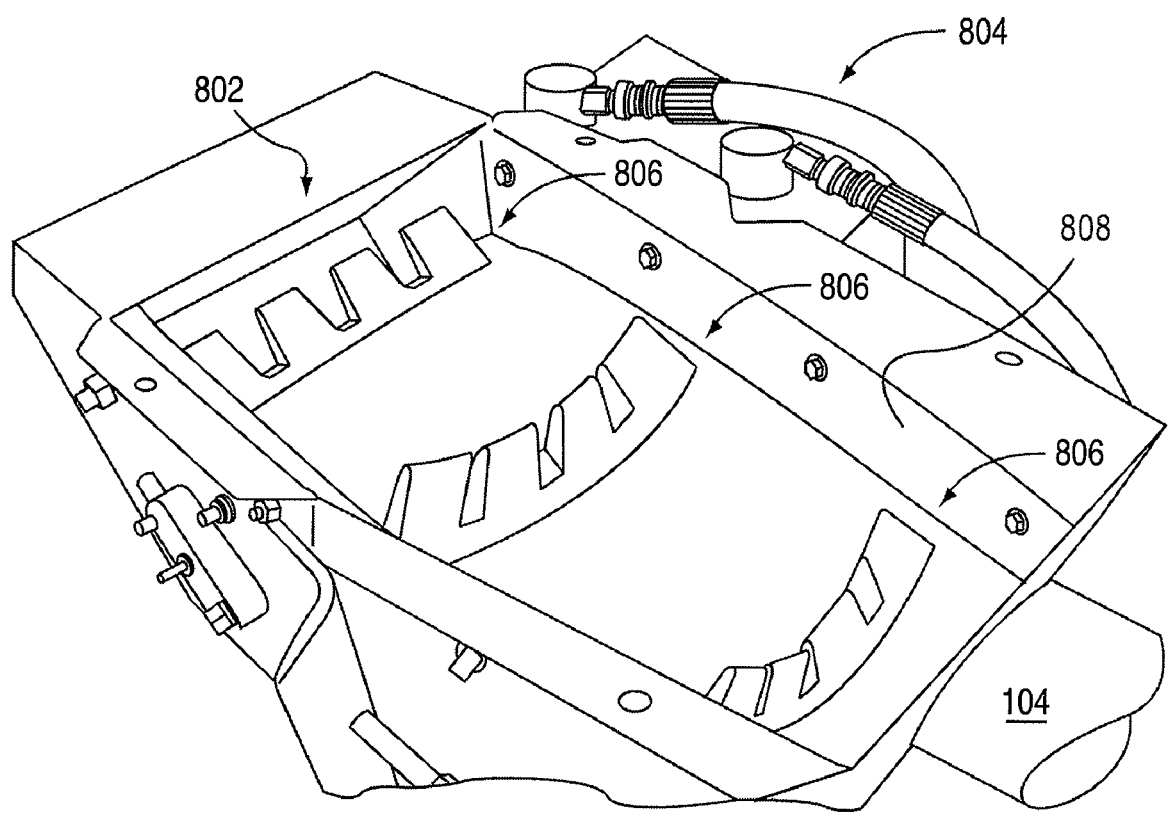
FIG. 8 is a view of the discharge end of a conveyor according to an embodiment of the present invention.

FIG. 8 is a view of a conveyor belt according to an embodiment of the present invention. The intake (conveyor hopper) end of a conveyor is shown at the point where the conveyor belt wraps around a motor driven roller 802. The motor may be a hydraulic motor and therefore, hydraulic hoses 804 provide hydraulic fluid flow to and from the motor. Teeth or cleats 806 are provided to push grain or seed up the conveyor. As shown, the conveyor belt is cupped or semi-circular in the tube section but flattens out as it reaches the roller 802. Channeling members (seals) 808 are provided on each side of the belt to form a seal and prevent grain or seed from falling off the edges of the belt as the belt begins to conform to the tubular portion of the conveyor 104.

Figure 9:
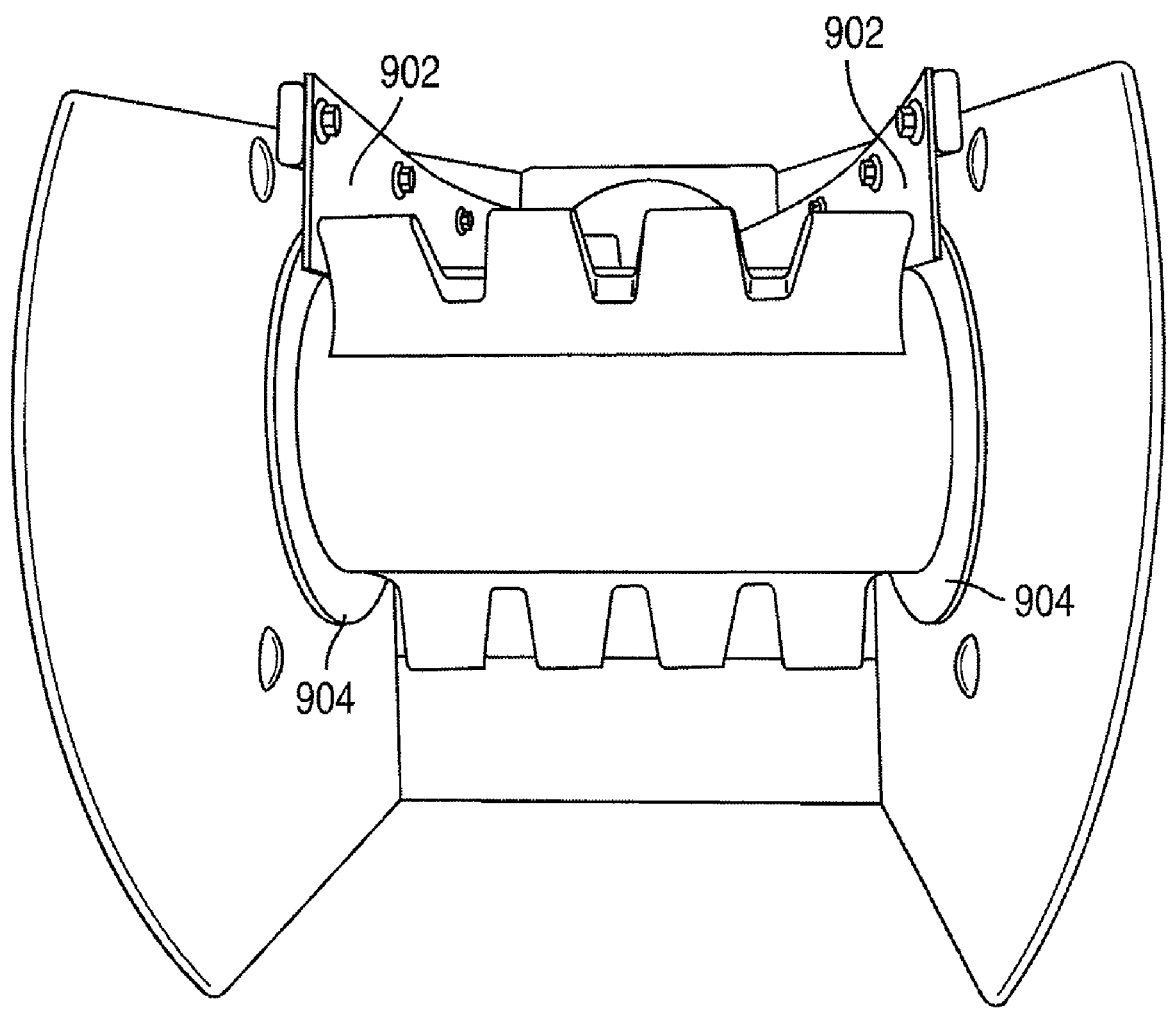
FIG. 9 is a forward view of a conveyor belt wrapping around a roller according to an embodiment of the present invention.

FIG. 9 is a front view of the belt as it travels over the roller 802. Channeling members (seals) 902 are provided on each side of the belt to form a seal and prevent grain or seed from falling off the edges of the belt as the belt flattens at the roller. As shown, the channeling members 902 can be fixed to the conveyor discharge 112 with bolts, but can be fixed by other means or can be integral with the discharge. Discs 904 can also be provided at the rollers at the edge of the belt to provide additional channeling/sealing means. The discs 904 are preferably integral with the rollers or coupled therewith so that they may rotate and have a diameter large enough so that the discs extend well beyond the belt surface.

The belt and cleats may be fabricated from conventional materials, such as nylon, rubber or plastic.

Figure 10:
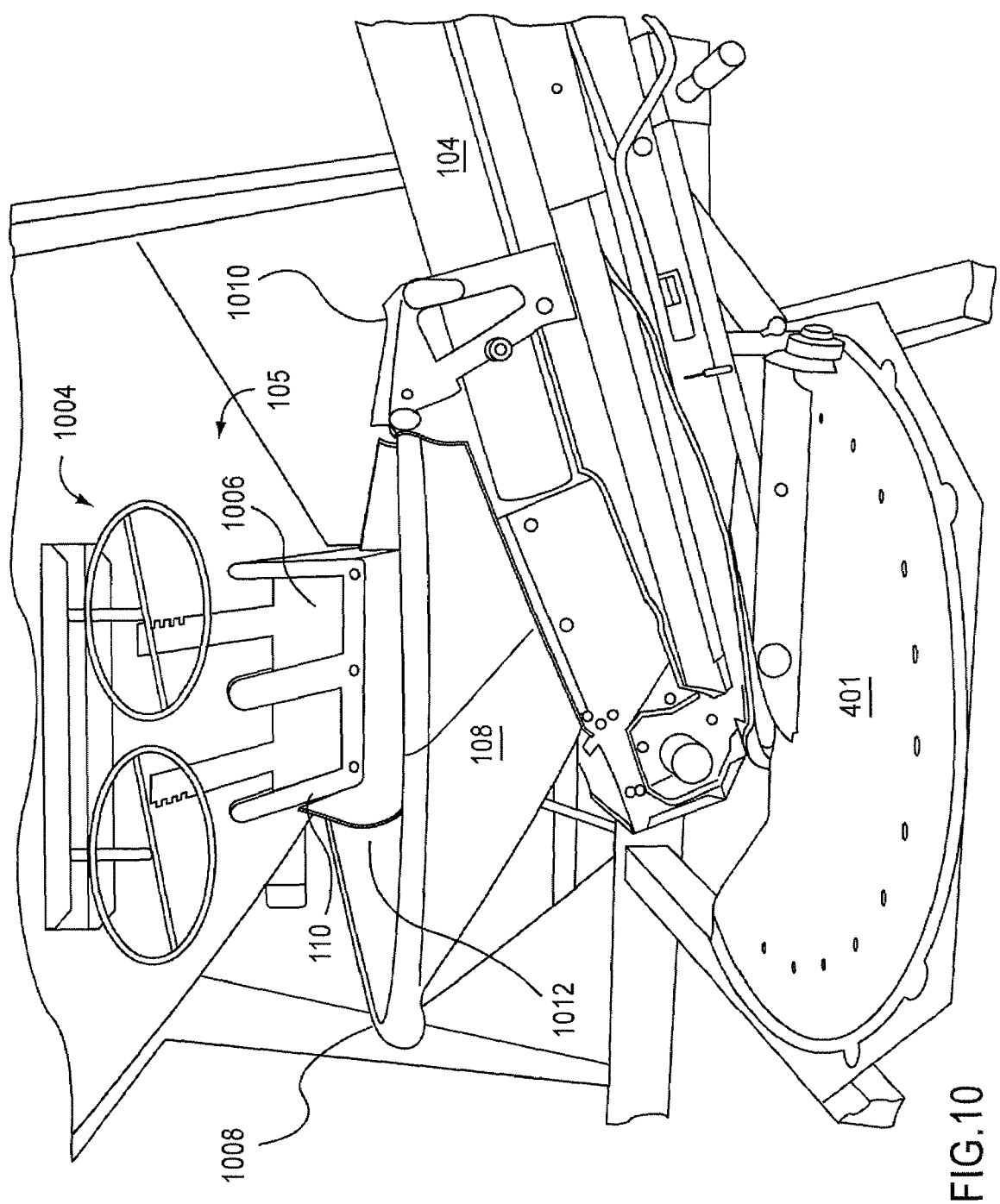
FIG. 10 is a view of the conveyor hopper in an unloading position according to an embodiment of the present invention.

FIG. 10 is a side view of the hopper end of the conveyor 104. As shown, conveyor hopper 108 sits above in ingress 1003 to the conveyor 104. When coupled to the support arm 102, as shown, the conveyor hopper 108 is positioned below a discharge of the main hopper 106. The discharge 110 may be opened by conventional means. As showed, a wheel handle mechanism 1004 is provided for opening the discharge doors 1006.

The conveyor hopper 108 is preferably manufactured from light weight materials such as plastic, canvas, nylon, rubber or vinyl. As shown, the hopper 108 may include a mechanism for opening and closing the hopper. In this embodiment, flexible coupling or hinge is provided at one end 1008 of the hopper 108 and a mechanism 1010 is provided at the end of the hopper 108 and is coupled with the conveyor 104, such that the hopper 108 may be made to have an appropriate fit with the discharge 110 of the main hopper 105. A flap 1012 can be provided at the bottom of the discharge 110. The hopper 108 may be collapsible.

Figure 11:
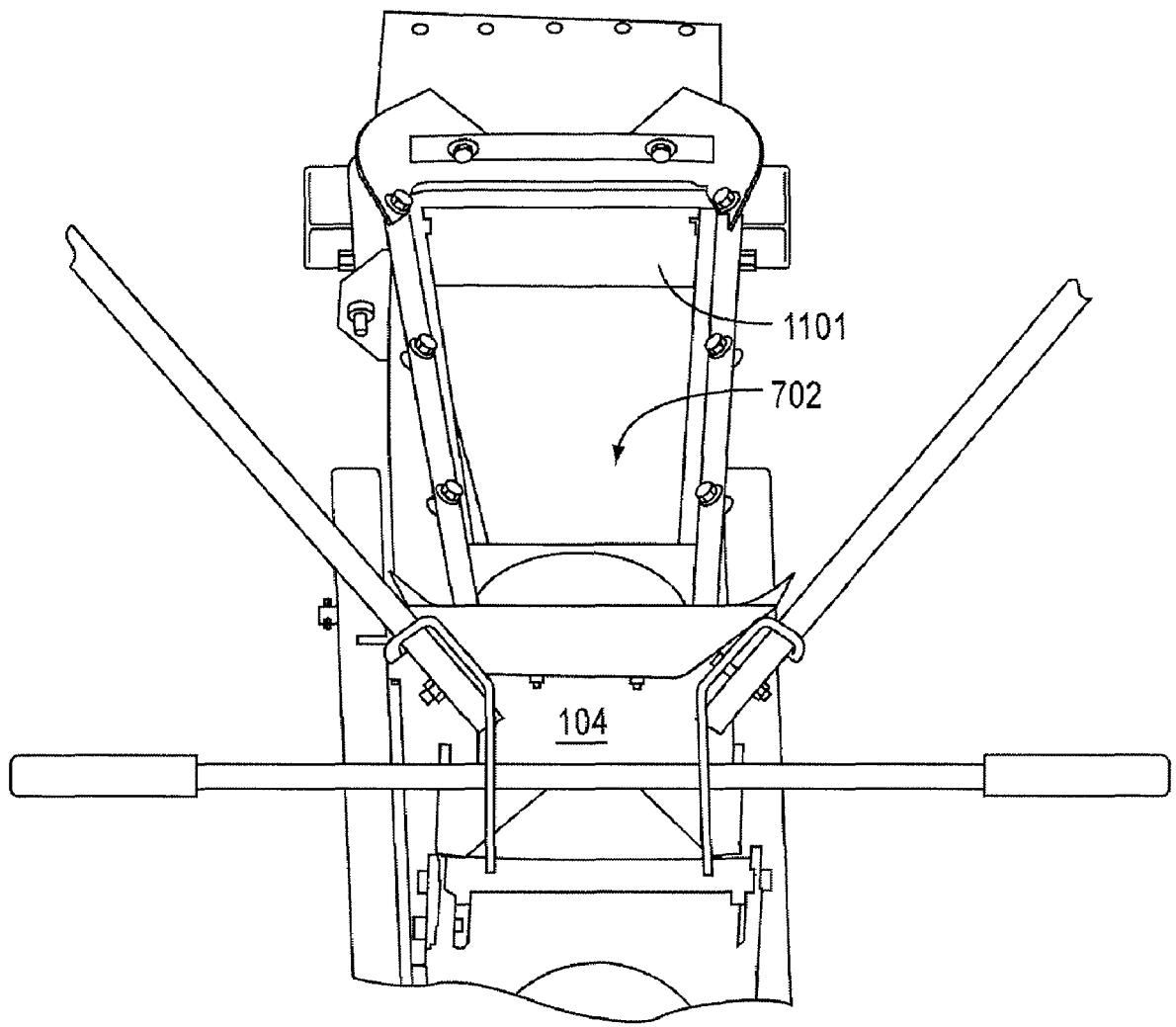
FIG. 11 illustrates the receiving end of the conveyor according to one embodiment of the present invention.

FIG. 11 is a schematic view of the hopper end of the conveyor. As is shown, a brush seal 1101 can be located across the belt 702. The brush seal 1101 retains the conveyed material within the hopper and does not allow the material to enter the void 707 (shown in FIG. 7) under the roller. Such an arrangement is desirable because it prevents the conveyed material from being subjected to mechanical agitation, which would result in damage to the conveyed material. The brush seal 1101 allows the conveyor teeth 806 to pass, but not the conveyed material.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention

We claim:

1. A tubular conveyor comprising:
   an intake end having a first roller;
   a discharge end having a second roller;
   a tubular portion disposed between said intake end and said discharge end;
   a continuous flexible conveyor belt coupled with said first and second rollers; and
   seal means for sealing edges of said conveyor belt at a point approximately where said conveyor belt meets at least one of said first and second rollers;
   wherein said seal means includes at least one side seal coupled to an interior wall of said discharge end or said intake end, said at least one side seal projecting towards said conveyor belt from said interior wall and abutting a top face of said conveyor belt.

2. The conveyor as recited in claim 1, wherein said at least one side seal is coupled with the discharge end of said conveyor.

3. The conveyor as recited in claim 1, wherein said seal means further includes a brush seal on said intake end to prevent conveyed material from falling over an edge of said conveyor belt.

4. The conveyor as recited in claim 1, wherein said seal means further includes first and second discs coupled with at least one of said first and second rollers.

5. The conveyor as recited in claim 1, wherein said intake end includes a brush seal for preventing material from entering space under said first roller.

6. The conveyor as recited in claim 1, wherein said conveyor belt further includes a plurality of spaced apart teeth.

7. The conveyor as recited in claim 6 wherein said intake end includes a brush seal positioned across a void under said first roller for allowing said teeth to pass therethrough without allowing material to move from said intake into space beyond said void.

8. The conveyor as recited in claim 1, wherein said at least one side seat is configured to abut said conveyor face at a point inside the edge of the conveyor belt.

9. The conveyor as recited in claim 1, wherein said at least one side seal projects inward from said interior wall.

* * * * *